United States Patent
Qiu

(10) Patent No.: US 9,948,941 B2
(45) Date of Patent: Apr. 17, 2018

(54) CIRCUIT, METHOD AND VIDEO DECODER FOR VIDEO DECODING

(71) Applicant: Montage Technology (Shanghai) Co., Ltd., Shanghai (CN)

(72) Inventor: Zhimin Qiu, Shanghai (CN)

(73) Assignee: MONTAGE TECHNOLOGY (SHANGHAI) CO., LTD., Shanghai (CN)

( * ) Notice: Subject to any disclaimer, the term of this patent is extended or adjusted under 35 U.S.C. 154(b) by 287 days.

(21) Appl. No.: 14/690,490

(22) Filed: Apr. 20, 2015

(65) Prior Publication Data

US 2016/0301942 A1    Oct. 13, 2016

(30) Foreign Application Priority Data

Apr. 10, 2015   (CN) .......................... 2015 1 0171047

(51) Int. Cl.
| | | |
|---|---|---|
| H04N 19/436 | (2014.01) | |
| H04N 19/82 | (2014.01) | |
| H04N 19/91 | (2014.01) | |
| H04N 19/513 | (2014.01) | |
| H04N 19/44 | (2014.01) | |
| H04N 19/40 | (2014.01) | |
| H04N 19/423 | (2014.01) | |

(52) U.S. Cl.
CPC .......... *H04N 19/436* (2014.11); *H04N 19/40* (2014.11); *H04N 19/423* (2014.11); *H04N 19/91* (2014.11)

(58) Field of Classification Search
CPC .... H04N 19/436; H04N 19/423; H04N 19/91; H04N 19/40
See application file for complete search history.

(56) References Cited

U.S. PATENT DOCUMENTS

| | | | |
|---|---|---|---|
| 9,338,467 B1 * | 5/2016 | Gadepalli | H04N 19/127 |
| 2005/0259877 A1 * | 11/2005 | Wang | H04N 19/119 382/236 |
| 2015/0103920 A1 * | 4/2015 | Rapaka | H04N 19/70 375/240.26 |
| 2015/0146794 A1 * | 5/2015 | Hoang | H04N 19/96 375/240.24 |

OTHER PUBLICATIONS

Gary J. Sullivan, Jens-Rainer Ohm, Woo-Jin Han, and Thomas Wiegand, Overview of the High Efficiency Video Coding (HEVC) Standard, IEEE Transactions on Circuits and Systems for Video Technology, Dec. 2012, pp. 1649-1668, vol. 22, No. 12.

(Continued)

*Primary Examiner* — Mohammed Jebari
*Assistant Examiner* — Nasim Nirjhar
(74) *Attorney, Agent, or Firm* — Oliff PLC

(57) ABSTRACT

A circuit for decoding a video, comprising: at least one entropy transcoder configured to perform at least one entropy transcoding on a received bit stream, to generate transcoded streams, wherein the entropy transcoding includes transcoding syntax for the bit stream; at least one main decoding unit configured to perform at least one transcoded stream decompression and pixel decodings on a frame of the transcoded streams.

23 Claims, 10 Drawing Sheets

(56) References Cited

OTHER PUBLICATIONS

Dajiang Zhou, Jinjia Zhou, Jiayi Zhu, Peilin Liu, and Satoshi Goto, A 2Gpixel/s H.264/AVC HP/MVC Video Decoder Chip for Super Hi-Vision and 3DTV/FTV Applications, 2012 IEEE International Solid-State Circuits Conference, 2012, ISSCC 2012/Session 121 Multimedia & Communications SoCs 112.6.

Yizhou Duan, Jun Sun, Leiju Yan, Keji Chen, and Zongming Guo, Novel Efficient HEVC Decoding Solution on General-purpose Processors, DOI 10.11091TMM.2014.2337834, IEEE Transactions on Multimedia, Jul. 10, 2014.

* cited by examiner

CIRCUIT, METHOD AND VIDEO DECODER FOR VIDEO DECODING

CROSS REFERENCE TO RELATED APPLICATION

This application claims priority to Chinese application No. 201510171047.9 entitled "CIRCUIT, METHOD AND VIDEO DECODER FOR VIDEO DECODING," filed on Apr. 10, 2015 by Montage Technology (Shanghai) Co., Ltd., which is incorporated herein by reference.

TECHNICAL FIELD

The present invention relates to decoding a video, and more particularly, but not limited to a circuit, a method and a video decoder for decoding a video.

BACKGROUND

In order to achieve high resolution video decoder throughput, for example, 4K@P60 (60 frames per second progressive scan, width 4096) or 8K@P60 (60 frames per second progressive scan, width 8192), conventionally a parallel processing with multiple hardware accelerators or multiple general purpose processors is needed. As for a multiple-hardware-accelerator solution, a frame level parallelization is used widely. As for a multiple-general-purpose-processor solution (CPU, GPU, DSP, etc.), various methods are used, including slice parallelization, tile parallelization, frame parallelization, basic wavefront parallelization, etc.

SUMMARY

An embodiment of the invention discloses a circuit for decoding a video, comprising: at least one entropy transcoder configured to perform at least one entropy transcoding on a received bit stream, to generate transcoded stream, wherein each of the at least one entropy transcoding includes transcoding syntax for the bit stream; at least one main decoding unit configured to perform at least one transcoded stream decompression and pixel decodings on a frame of the transcoded streams.

Alternatively, the at least one entropy transcoder comprises a plurality of transcoders, and the at least one main decoding unit comprises a plurality of main decoding units, wherein: the plurality of entropy transcoders is configured to perform a plurality of entropy transcodings on a received bit stream, in a frame level parallelization, to generate transcoded streams, wherein each of the plurality of entropy transcoding includes transcoding syntax for the bit stream; the plurality of main decoding units are configured to perform a plurality of transcoded stream decompression and pixel decodings on a frame of the transcoded streams in a multi-layer wavefront level parallelization.

A video decoder, comprising the above discussed circuit.

In another embodiment of the invention, a method of decoding video comprises performing at least one entropy transcoding on a received bit stream, to generate transcoded stream, wherein each of the at least one entropy transcoding includes transcoding syntax for the bit stream; performing at least one transcoded stream decompression and pixel decodings on a frame of the transcoded streams.

Alternatively, performing the at least one entropy transcoding further comprises performing, a plurality of entropy transcodings on a received bit stream, in a frame level parallelization, to generate transcoded streams, wherein each of the plurality of entropy transcoding includes transcoding syntax for the bit stream; and performing at least one transcoded stream decompression and pixel decodings further comprises performing a plurality of pixel decodings on a frame of the transcoded streams in a multi-layer wavefront level parallelization.

DESCRIPTION OF THE DRAWINGS

The present invention is illustrated in an exemplary manner by the accompanying drawings. The drawings should be understood as exemplary rather than limiting, as the scope of the invention is defined by the claims. In the drawings, the identical reference signs represent the same elements.

DETAILED DESCRIPTION

Various aspects and examples of the invention will now be described. The following description provides specific details for a thorough understanding and enabling description of these examples. Those skilled in the art will understand, however, that the invention may be practiced without many of these details. Additionally, some well-known structures or functions may not be shown or described in detail, so as to avoid unnecessarily obscuring the relevant description.

In the following description, the data range is illustrated below:

Entropy transcoder: 0~P−1;
Main decoding unit: 0~L−1;
Transcoded stream per frame in DDR: 0~K−1;
Picture height in CTU: 0~N−1; and
Picture width in CTU: 0~M−1.

Figure 1:
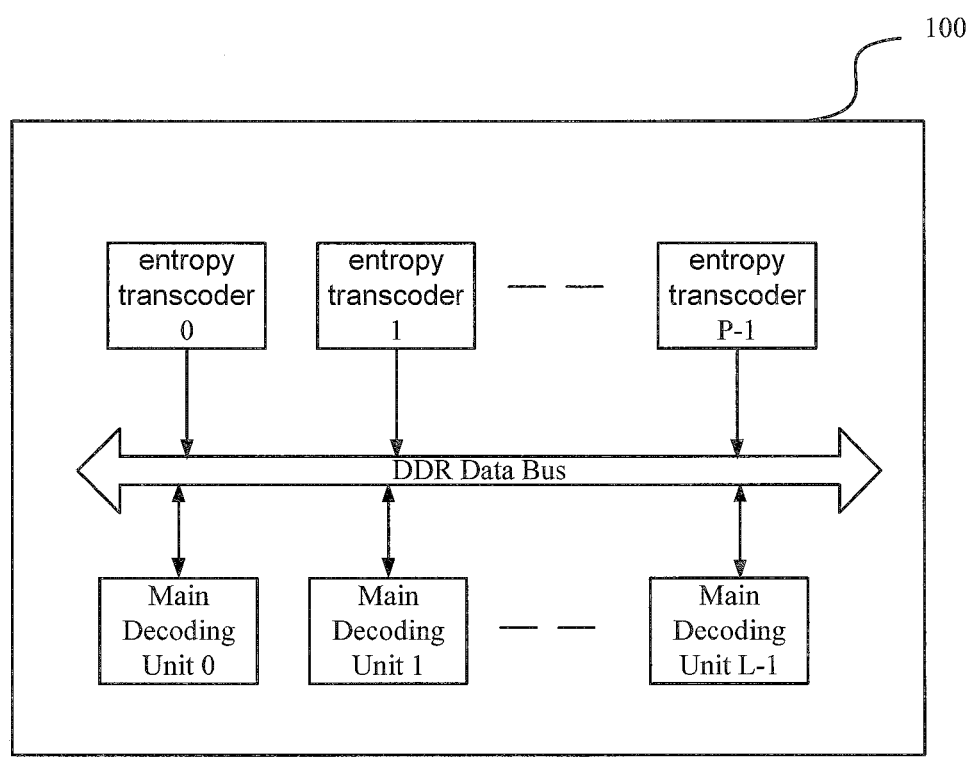
FIG. 1 is a diagram illustrating an embodiment of a circuit 100.

FIG. 1 is a diagram illustrating an embodiment of a circuit 100.

The circuit 100 comprises a plurality of entropy transcoders numbered 0, 1, . . . P−1, and a plurality of main decoding units 0, 1, . . . L−1. The plurality of entropy transcoders 0, 1, P−1 perform a plurality of entropy transcodings on a received bit stream, in a frame level parallelization, to generate transcoded (or re-compressed) streams, wherein each of the plurality of entropy transcoding includes transcoding syntax for the bit stream. In an embodiment, the plurality of entropy transcoders are frame level entropy transcoders that perform the plurality of entropy transcodings in a frame level parallelization, which means that entropy transcodings are simultaneously performed on a plurality of frames in parallel. According to an embodiment, there are a plurality of entropy transcoders, say P entropy transcoders, and each entropy transcoder processes bit-streams from a distinctive frame from the other entropy transcoder, or in other words, the P entropy transcoders process bitstreams from different frames in parallel.

The plurality of main decoding units 0, 1, ... L–1 perform a plurality of transcoded stream decompression and pixel decodings on a frame of the transcoded streams in a multi-layer wavefront level parallelization. Note the plurality of entropy transcoder and the plurality of main decoding units can perform their respective operations in parallel, or in other words, simultaneously. In some embodiment, the parallel operations between the entropy transcoder and the main decoding unit may be realized by DDR. For example, when the system initially starts, a main decoding unit may be in an idle status. When a first frame of the transcoded streams is ready, the main decoding unit may start working. Meanwhile, the entropy transcoder may start processing a second frame of the transcoded streams.

A wavefront parallel processing (WPP), or wavefront parallelization is when a slice is divided into rows of CTUs in which the first row is decoded normally but decoding each additional row requires related information of previous row. The WPP has the entropy encoder use information from the preceding row of CTUs and allows for a method of parallel processing that may allow for better compression than tiles. The details of the wavefront parallelization will be discussed below in details with reference to FIGS. 2A and 2B.

In an embodiment, the received bit stream may be encoded in different formats. Each of the plurality of the entropy transcoders transforms the received bit stream encoded in different formats into the transcoded stream in a unified wavefront sub-steam format.

Although FIG. 1 shows an embodiment that includes a plurality of entropy transcoders and a plurality of main decoding units, alternatively, embodiments of the invention further include a circuit which includes an entropy transcoder and a main decoding unit. The entropy transcoder is configured to perform at least one entropy transcoding on a received bit stream, to generate transcoded stream, wherein the entropy transcoding includes transcoding syntax for the bit stream. The main decoding unit is configured to perform at least one transcoded stream decompression and pixel decodings on a frame of the transcoded streams.

Alternatively, embodiments of the invention further apply to a circuit including an entropy transcoder and a plurality of main decoding units, or a circuit including a plurality of entropy transcoders and a main decoding unit.

Figure 2A:
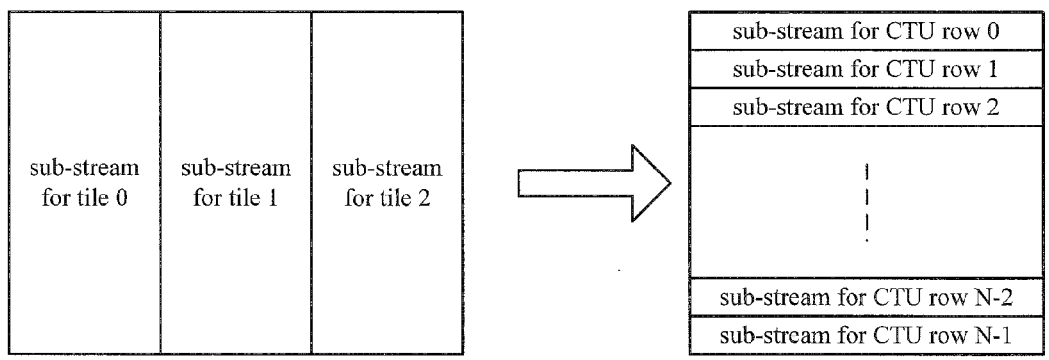
FIGS. 2A and 2B are respective diagrams illustrating how pictures with different picture structures are transformed into a wavefront style in embodiments.
Figure 2B:
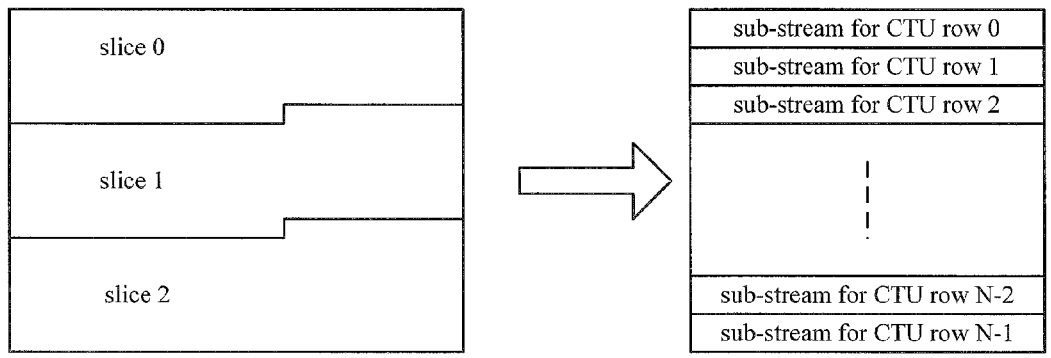

FIG. 2A and FIG. 2B are respective diagrams illustrating how pictures with different picture structures are transformed by entropy transcoders into a wavefront style in embodiments.

Entropy transcoders run in parallel and process compressed streams for different frames. The input of Entropy Transcoder can comply with various codec standards such as HEVC/H.265, Google VP9 and China AVS2 with various picture structures such as tiles, slices or wavefronts. After entropy transcoding, the entropy transcoders will output transcoded streams in a unified wavefront sub-streams format so that a later stage can process the transcoded streams properly and efficiently. As illustrated in FIGS. 2A and 2B, one picture of M×N CTUs with multiple tiles or multiple slices will be transformed to N sub-streams in wavefront style.

To be specific, in FIG. 2A, the received bit stream shown in the left part is arranged in a tile structure. Tiles allow for the picture to be divided into a grid of rectangular regions that can independently be decoded/encoded. The main purpose of tiles is to allow for parallel processing. The received bit stream arranged in tiles are transformed into wavefront style shown in the right part of FIG. 2A. The frame shown in the right part of FIG. 2A is arranged in a wavefront style, that means, the frame is divided into rows of CTUs in which the first row is decoded normally but decoding each additional row requires related information of previous row.

In FIG. 2B, the received bit stream shown in the left part is arranged in a slice structure. Slices are CTUs decoded in the order of a raster scan. The term raster scan, or raster scanning, means the rectangular pattern of image capture and reconstruction in television. By analogy, the term is also used for raster graphics, the pattern of image storage and transmission used in most computer bitmap image systems. The received bit stream arranged in slices are transformed into wavefront style shown in the right part of FIG. 2B. The frame shown in the right part of FIG. 2B is arranged in a wavefront style, that means, the frame is divided into rows of CTUs in which the first row is decoded normally but each additional row requires related information of previous row.

Figure 3:
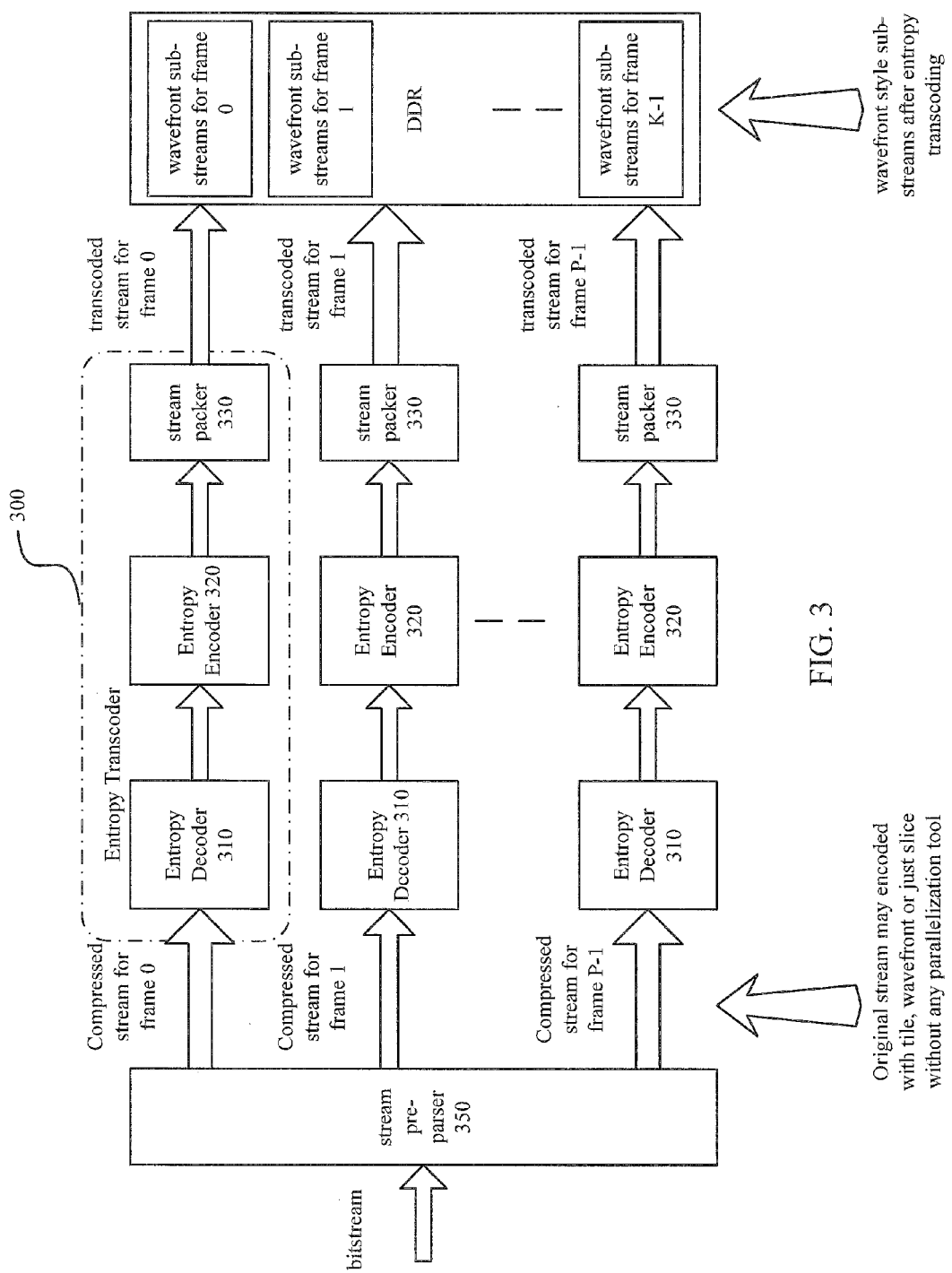
FIG. 3 is a diagram illustrating a structure of an entropy transcoder.

FIG. 3 is a detailed block diagram illustrating a structure of each of the entropy transcoders (0 to P–1) shown in FIG. 1.

Entropy Transcoder 300 shown in FIG. 3 includes three parts: an Entropy Decoder 310, an Entropy Encoder 320 and a stream packer 330. A stream pre-parser 350 before the entropy transcoder 300 scans original bit stream and delivers coded stream data of one frame to every entropy transcoder 300. The entropy decoder 310 entropy decodes the received bit stream encoded in different formats. The entropy encoder 320 entropy encodes the decoded bit stream, and the decoded bit stream can also be called as transcoded stream, since it is first decoded then encoded. The transcoded stream will be packed into a unified format of wavefront sub-streams (or also called a unified wavefront sub-stream format bit streams) by the stream packer 330, and stored in Double Data Rate (DDR) memory along with sub-streams entry points. DDR represents a kind of widely used storage memory in electronic system, which may be an off-chip memory. An entry point means an offset of a particular sub-stream with respect to a first sub-stream of the same frame in DDR. Commands needed by later stage decoding will be stored in a command queue of DDR. Multiple Entropy Transcoder Units will run in frame parallelism.

Figure 4:
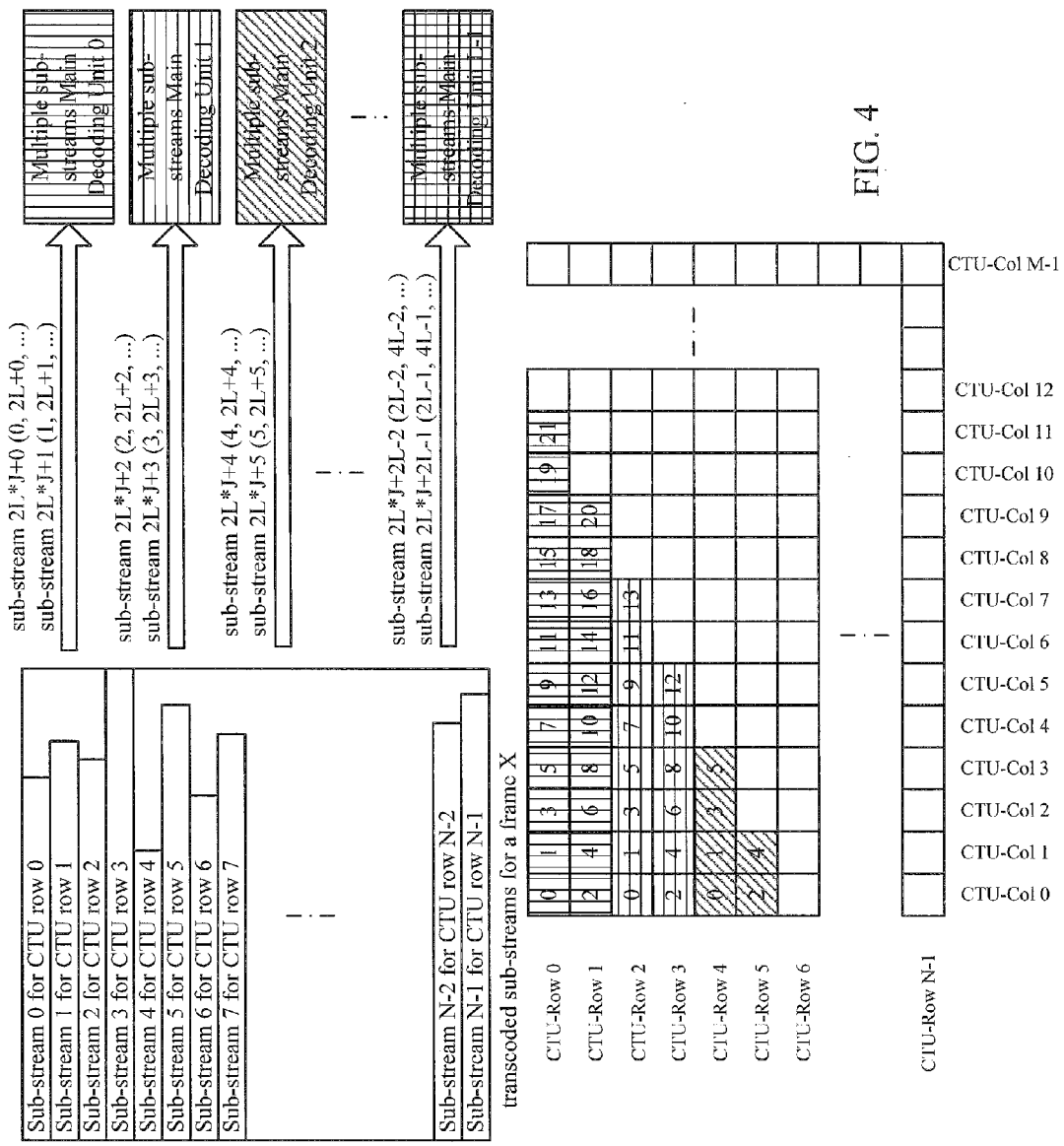
FIG. 4 is a diagram illustrating processing orders by a main decoding unit for decoding multiple CTU-Rows in an embodiment.

FIG. 4 is a diagram illustrating processing orders by a main decoding unit for decoding multiple CTU-Rows in an embodiment. As shown in FIG. 4, transcoded wavefront sub-streams and related information will be stored in DDR per frame. Note the exemplary transcoded sub-streams for a frame X shown in FIG. 4 is the same as the right parts of either FIG. 2A or FIG. 2B. In FIG. 4, different sub-streams and related information may vary in length. Note some sub-streams, for example, the length of sub-stream 3 for CTU row 3 is different from the length of sub-stream N–2 for CTU row N–2, because their amount of information is different. Furthermore, exemplary transcoded sub-streams is just used to indicate the length of different sub-stream may vary, but not state for actual memory storage mapping of sub-streams.

Suppose a total of L main decoding units are operating. The number L may vary according to a system performance and a power consumption requirement. A number J may be defined as J=ceil(N/2L)−1, where N represents the number of CTU rows that a picture may comprise. A Ceil (or sometimes called ceiling) function maps a real number to the smallest following integer. Therefore the sequence number of the sub-streams can be represented as 2L*J+0, 2L*J+1, 2L*J+2, 2L*J+3, 2L*J+4, 2L*J+5 . . . 2L*J+2L−2, 2L*J+2L−1. When J=0, the above representations take the values of 0, 1, 2, 3, 4, 5 . . . 2L−2, 2L−1. When J=1, the above representations take the values of 2L+0, 2L+1, 2L+2, 2L+3, 2L+4, 2L+5, 4L−2, 4L−1.

Suppose each main decoding unit is capable of decoding two sub-streams. Then sub-stream 2L*J+0 and sub-stream 2L*J+1 are processed by a main decoding unit 0, which is represented as a block in vertical lines. Sub-stream 2L*J+2 and sub-stream 2L*J+3 are processed by a main decoding unit 1, which is represented as a block in horizontal lines. Sub-stream 2L*J+4 and sub-stream 2L*J+5 are processed by a main decoding unit 2, which is represented as a block in slash lines . . . . Sub-stream 2L*J+2L−2 and sub-stream 2L*J+2L−1 are processed by a main decoding unit L−1, which is represented as a block in cross lines.

In the lower part of FIG. 4, each block represents a Coding Tree Unit (CTU). The number in sub-block represents the processing order of CTU per Decoding Unit. FIG. 4 gives one example for M×N CTUs picture decoding. Every main decoding unit processes two sub-streams per a command, and decodes two CTU-Rows in a diagonal order. For example, the main decoding unit 0 processes sub-streams 0 and 1, and decodes CTU-Rows 0 and 1 (CTU-Rows 0 and 1 are marked in vertical lines, which means they are decoded by the main decoding unit 0); the main decoding unit 1 processes sub-streams 2 and 3, and decodes CTU-Rows 2 and 3 (CTU-Rows 2 and 3 are marked in horizontal lines, which means they are decoded by the main decoding unit 1); the main decoding unit 2 processes sub-streams 4 and 5, and decodes CTU-Rows 4 and 5 (CTU-Rows 4 and 5 are marked in slashed lines, which means they are decoded by the main decoding unit 2), etc. The blank sub-blocks, i.e., the sub-blocks that have no numbers represent the sub-blocks which have not been decoded.

Every main decoding unit (0, 1, . . . L−1) will read transcoded sub-streams from DDR, and process different sub-streams of same frame in parallel. Every main decoding unit (0, 1, . . . L−1) can process multiple sub-streams simultaneously, and process multiple CTU-Rows in the diagonal order so that reference pixels of neighbor CTUs can be reused probably and a motion compensation local Cache's hit rate can be improved as shown in FIG. 5.

Note in the above embodiment, the CTU is used as an example for illustrating basic processing unit. However, embodiments of the invention are not limited to the CTU. Embodiments of the invention also apply to other basic processing unit, such as super-block for Google VP9, or macroblock units, etc. Further, although FIG. 4 illustrates that each main decoding unit simultaneously process two CTU-Rows, the main decoding unit may process more than two CTU-Rows simultaneously.

Figure 5:
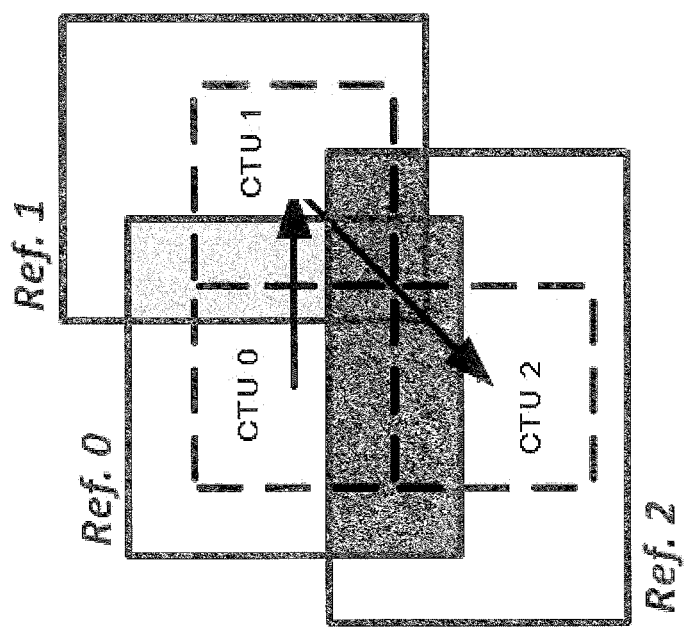
FIG. 5 is a diagram illustrating how reference data are shared across multiple CTUs when they are processed in a diagonal order according to an embodiment of the invention.

FIG. 5 is a diagonal illustrating how reference data is shared across multiple CTUs when they are processed in a diagonal order according to an embodiment of the invention. Diagonal order in FIG. 5 can reuse inter reference data in both horizontal and vertical directions. For example, when the main decoding unit 0 decodes CTU2 according to an embodiment of the invention, the main decoding unit 0 may refer to inter reference data 2 (Ref. 2). The main decoding unit 0 may refer to inter reference data 0 (Ref.0) for decoding CTU0. The main decoding unit 0 may refer to inter reference data 1 (Ref.1) for decoding CTU1. Note CTU0, CTU1 and CTU2 are respectively shown in blocks in dotted lines, while Ref. 0, Ref.1 and Ref. 2 are respectively shown in blocks in solid lines. Note the reference Ref. 0 is from a different frame from the frame of the currently decoded CTU0, and same rule applied for Ref.1 and Ref.2. An overlap between Ref.2 and Ref. 0 of neighbor CTU (CTU0) is in vertical direction of currently decoding CTU (CTU2), and an overlap between Ref.1 and Ref.0 of neighbor CTU (CTU0) that is in horizontal direction of currently decoding CTU (CTU1). Therefore, when CTU are processed, inter reference data of both horizontally and vertically neighbor CTUs may be shared and reused.

Referring to FIG. 4 in combination with FIG. 5, in embodiments of the invention, when the main decoding unit 0 decodes a CTU (CTU 2) in a lower row (e.g., CTU-Row 1), it will refer to information of the top right CTUs (both CTU 0 and CTU 1) of the CTU 2 in CTU 2's upper row. Therefore the decoding progress of the lower row is slower than the upper row. When CTU2 is encoded in intra prediction mode, pixels of top right CTUs will also be referred, and when CTU is encoded in inter prediction mode, inter reference data of top right CTUs probably can be reused partly due to their spatial correlation. In other words, the decoded CTU pattern is indented row by row in FIG. 4. Further, when decoding CTU 1, the main decoding unit 0 also makes reference to CTU0 and reuse inter reference data of CTU0 when CTU1 is encoded in inter prediction mode. In this way, the embodiment reuses inter reference data in both vertical and horizontal directions, so as to improve the data correlation, and save bandwidth.

Further, multi-layer wavefronts include a first layer of wavefront and a second layer of wavefront. The first layer of wavefront means that one main decoding unit is used to simultaneously decode a plurality of sub-streams. Multiple CTU rows in a diagonal order are processed by a main decoding unit so that a motion compensation local Cache's hit rate can be improved. The second layer of the wavefront means that a plurality of main decoding units can work simultaneously, and that the plurality of main decoding units work in paralleled in a wavefront style. For example, each main decoding unit can simultaneously decode 2 sub-streams, and three main decoding units can work in parallel. Therefore, a total of 6 sub-streams can be decoded in parallel.

Figures 6A, 6B:
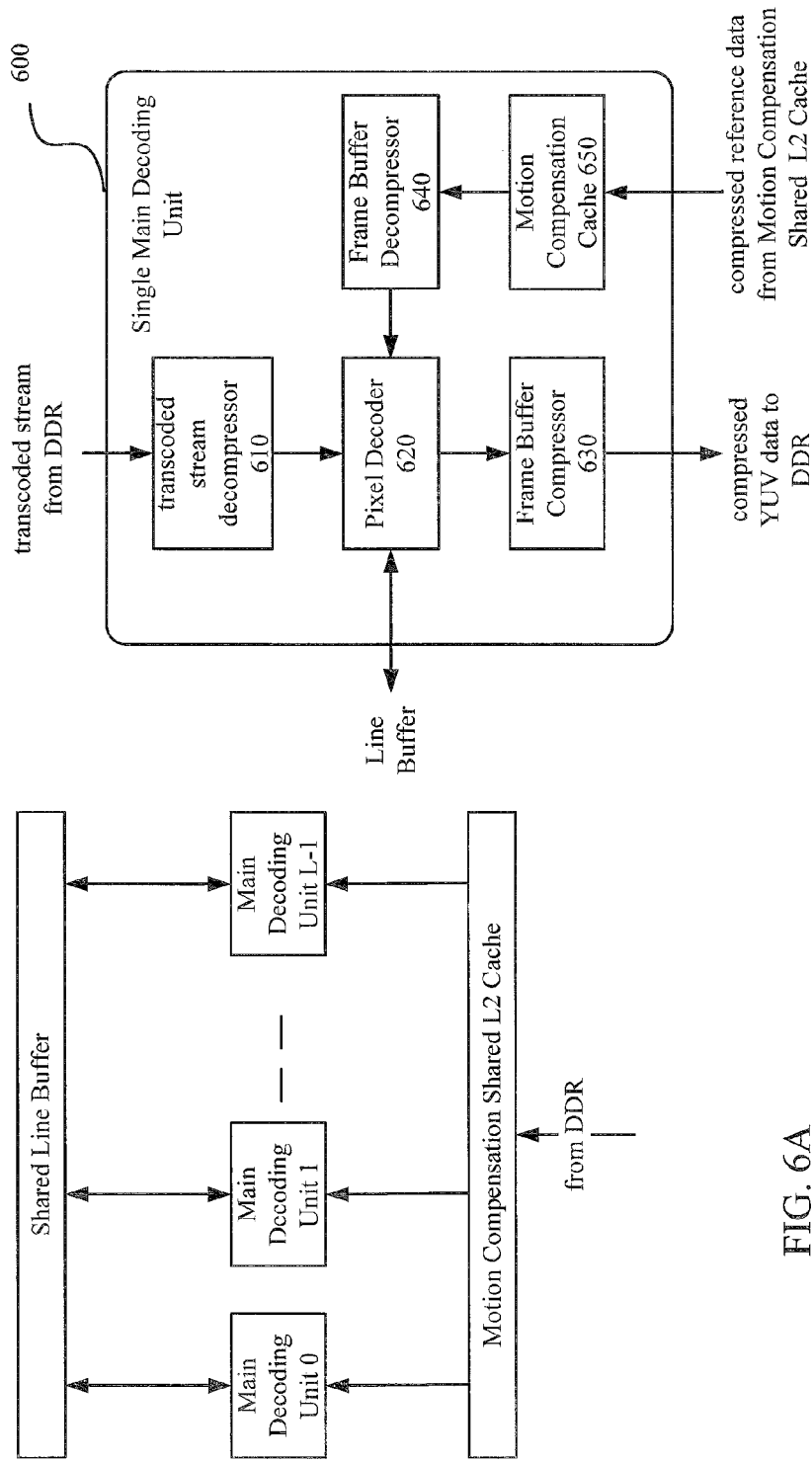
FIG. 6A is a diagram illustrating that Motion compensation L2 Cache and line buffer are shared across multiple main decoding units.
FIG. 6B is a diagram illustrating a structure of single main decoding unit.

FIG. 6A is a diagram illustrating that Motion compensation L2 Cache and line buffer are shared across multiple main decoding units.

As shown in FIG. 6A, a plurality of main decoding units 0, 1, . . . L−1 shares one motion compensation shared L2 (level 2) Cache and one line buffer. By keeping different main decoding units in a proper pace, shared L2 Cache's hit rate can be improved to save bandwidth. Shared L2 Cache may store information related to inter reference data. Statistically, inter reference data for different main decoding units may overlap. By storing the inter reference data in the L2 Cache, the times for accessing inter reference data from the DDR is reduced, therefore improves circuit efficiency.

Multi-level Cache is deployed to further minimize a bandwidth requirement. In an embodiment, every main decoding unit has its own local Cache, which is level 1 cache, and all main decoding units will share one shared L2 Cache.

A line buffer can be shared across multiple main decoding units with the wavefront architecture, such as an intra prediction line buffer, a deblocking filter line buffer, a sample adaptive offset filter line buffer, etc. No matter how many main decoding units will be instanced, required line buffer size is the same as the size of line buffer required by a single main decoding unit. This is because at the same time, different main decoding units will process CTUs at different columns, therefore the line buffer size is only dependent on the picture width. Compared to other methods with the frame level parallelization, the line buffer memory size can be reduced greatly so that a hardware implementation cost can be saved in embodiments of the invention.

A multi-level motion compensation cache as well as a wavefront architecture enable reference pixels to be reused across multiple main decoding units. It can save more bandwidth compared to conventional cache by prior arts such as pixel decoding frame level parallelism because embodiments of the invention have better correlation and spatial locality as the parallelization of embodiments of the invention deal with neighbouring CTUs in the same frame. Further, the multi-level motion compensation cache includes main decoding unit's local (L1) motion compensation Cache and the level 2 cache shared by a plurality of main decoding units.

Compared to a single layer wavefront in conventional HEVC standard, the multi-layer wavefront and the multi-level Cache according to embodiments of the invention are used to minimize bandwidth requirement that is critical for 4K/8K video system. The first layer of the wavefront is used to decode multiple CTU (CTU is short for Coding Tree Unit, and also super-block for Google VP9) rows in the diagonal order by the main decoding unit so that the motion compensation local Cache's hit rate can be improved; and the second layer of the wavefront is used to make the main decoding unit work paralleled in the wavefront style and the second level Cache's hit rate also can be improved.

FIG. 6B is a diagram illustrating a structure of a single main decoding unit. The single main decoding unit 600 includes a transcoded stream decompressor 610, a pixel decoder 620, a motion compensation cache 650, a frame buffer compressor 630 and a frame buffer decompressor 640.

The transcoded stream decompressor 610 decompresses the transcoded stream so as to generate a decompressed stream. Note the transcoded stream is from DDR. The pixel decoder 620 performs inverse quantization, inverse transform, intra prediction, motion compensation and a loop filter functionality on the decompressed stream. The pixel decoder 620 interacts with the transcoded stream decompressor 610, the line buffer, the frame buffer decompressor 640 and the frame buffer compressor 630.

The frame buffer compressor 630 compresses reconstruction YUV data of the decompressed stream. The compressed reconstruction YUV data generated by the frame buffer compressor 630 is provided to the DDR.

The motion compensation cache 650 caches motion compensation reference data of the decompressed stream into data in a compressed YUV format that was generated by frame buffer compressor 630 and buffered in DDR. As motion compensation cache 650 may use a plurality of inter reference data, the motion compensation cache 650 may read a plurality of motion compensation reference data previously generated by the frame buffer compressor 630 and buffered in DDR. The motion compensation reference data stored in the motion compensation cache 650 is compressed, and is from a Motion Compensation Shared L2 cache shown in FIG. 6A. The YUV model defines a color space in terms of one luma (Y) and two chrominance (UV) components.

The frame buffer compressor 630 and the frame buffer decompressor 640 may mitigate the communication bus's communication pressure with the DDR, since the size of compressed data is reduced compared with uncompressed data, thus consumes less communication bus resources as well as saving power. Note the frame buffer compressor 630 and the frame buffer decompressor 640 may be omitted in an embodiment.

The frame buffer decompressor 640 decompress the data in the compressed YUV format obtained from the motion compensation cache 650. Note the frame buffer decompressor 640 is needed when the motion compensation cache 650 of the main decoding unit 600 reads compressed reference frames that was generated by frame buffer compressor 630. By locating the frame buffer decompressor 640 after the motion compensation cache 650, the motion compensation cache 650's utilization can be improved or smaller motion compensation cache 650 can be used compared to other conventional solution that locates the frame buffer decompressor ahead of the Cache, as according to the embodiments, the compressed data are much smaller than the decompressed data, and requires less spaces on the on-chip memory that could be Static Random Access Memory (SRAM), Embedded Synchronous Dynamic Random Access Memory (eSDRAM), etc., or the same on-chip spaces may store more information.

By keeping different main decoding units in proper pace, the shared L2 Cache's hit rate can be improved to save bandwidth.

The circuit discussed above may be used in any products that include video decoders, such as Set-Top-Box (STB)s, digital television (DTV)s, tablets, smart phones, laptops and personal computers, personal digital assistant (PDA)s, etc.

Figure 7:
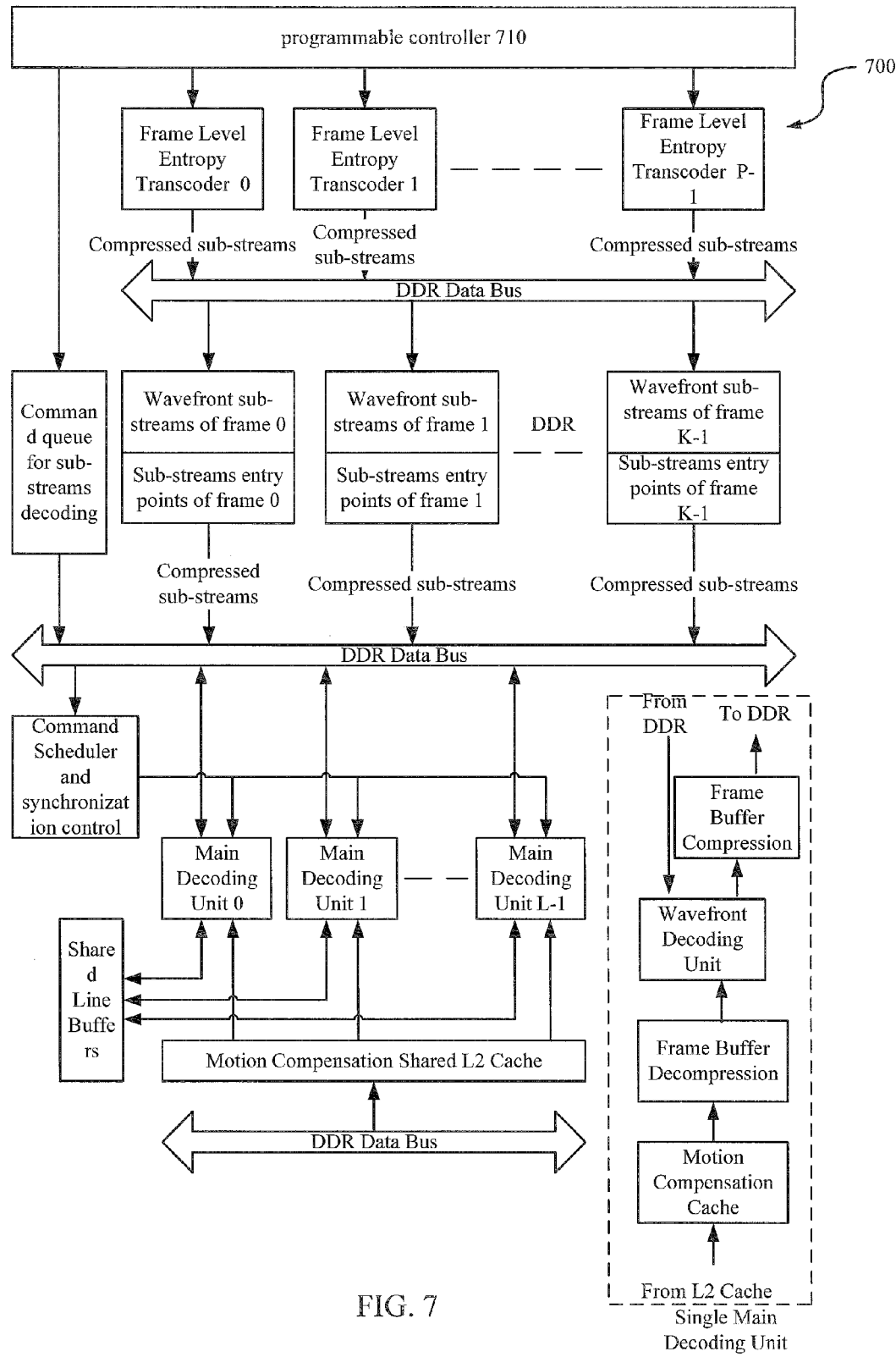
FIG. 7 is a diagram illustrating a structure of video decoder.

FIG. 7 is a diagram illustrating a structure of video decoder. The video decoder 700 comprises a programmable controller 710, a plurality of frame level entropy transcoders 0, 1, P−1, DDR data bus, a plurality of main decoding units 0, 1, L−1, and a motion compensation shared L2 Cache. The frame level entropy transcoders 0, 1, . . . P−1 are similar to entropy transcoders 0, 1, . . . P−1 in FIG. 1. Main decoding unit 0, 1, . . . L−1 are similar to main decoding units 0, 1, . . . L−1 shown in either FIG. 1 or FIGS. 6A and 6B.

As shown in FIG. 7, a programmable controller (it could be CPU, DSP, MCU, etc.) sends instruction to the plurality of the entropy transcoder units 0, 1, . . . P−1. Each of the plurality of entropy transcoder units generate compressed sub-streams, and stores their corresponding compressed sub-streams in the DDR memory via DDR data bus. Based on a command queue for sub-streams decoding output by the programmable controller, the transcoded stream will be packed into a unified format of wavefront sub-streams, and stored in the DDR along with sub-streams entry points. In an embodiment, sub-streams of a frame and sub-stream entry points for the same frame are stored together. Alternatively, sub-streams of a frame and sub-stream entry points for the same frame may be stored separately, that is, in different off-chip or on-chip memory.

Each of the Main decoding units 0, 1, L−1 reads compressed sub-streams from the DDR memory via DDR data bus, and output the decoded data to the DDR, according to interaction with a command scheduler, a synchronization control, shared line buffers and the motion compensation shared L2 cache. Note as the parts related to the main decoding units are similar to the main decoding units 0 . . . L−1 discussed with respect to FIGS. 6A and 6B, their descriptions are omitted in an embodiment.

Figure 8:
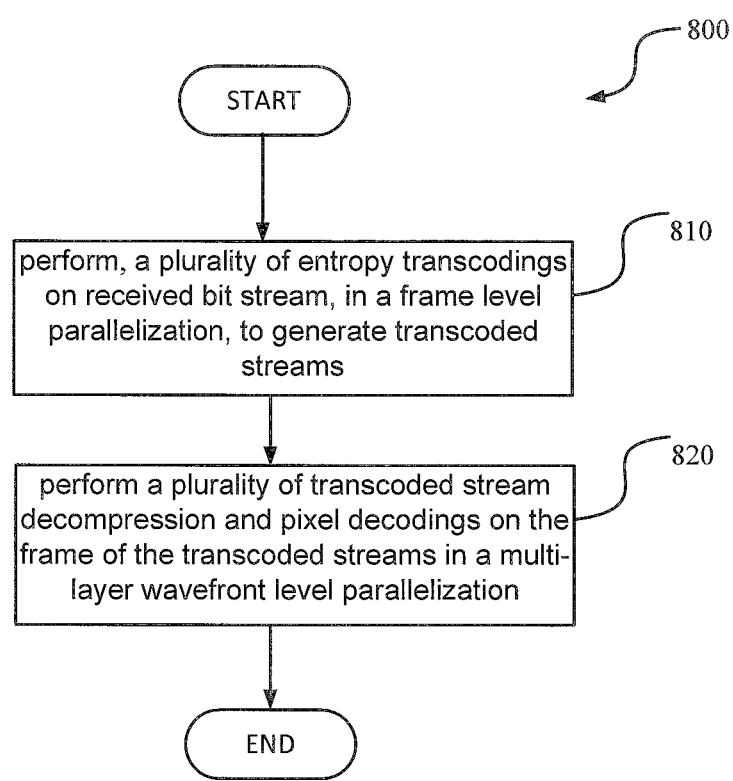
FIG. 8 is a flow chart of a method illustrating an embodiment of the invention.

FIG. 8 is a flow chart of a method illustrating an embodiment of the invention. The method 800 of decoding video comprises performing in block 810, a plurality of entropy transcodings on a received bit stream, in a frame level parallelization, to generate transcoded streams, wherein each of the plurality of entropy transcoding includes transcoding syntax for the bit stream; performing, in block 820, a plurality of transcoded stream decompression and pixel decodings on a frame of the transcoded streams in a multi-layer wavefront level parallelization.

Alternatively, the received bit stream is encoded in different formats, wherein performing each of the plurality of entropy transcoding further comprises transforming the received bit stream encoded in different formats into the transcoded stream in a unified wavefront substeam format.

Alternatively, the different formats include tile parallelization, wavefront parallelization, slice parallelization or slice without parallelization.

Figure 9:
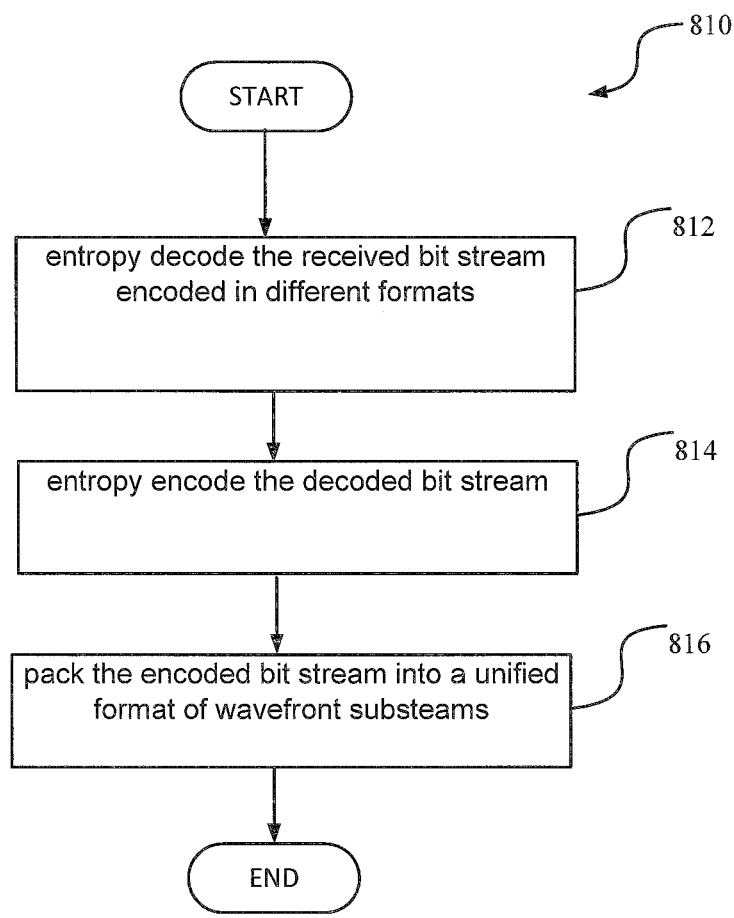
FIG. 9 is a flow chart illustrating a detailed operation of entropy transcoding.

FIG. 9 is a flow chart illustrating a detailed operation of entropy transcoding shown in block 810 in FIG. 8. Alternatively, the received bit stream is encoded in different formats. Performing, in block 810, each of the plurality of entropy transcoding further comprises entropy decoding, in block 812, the received bit stream encoded in different formats; entropy encoding, in block 814, the decoded bit stream; and packing, in block 816, the encoded bit stream into a unified format of wavefront substeam.

Figure 10:
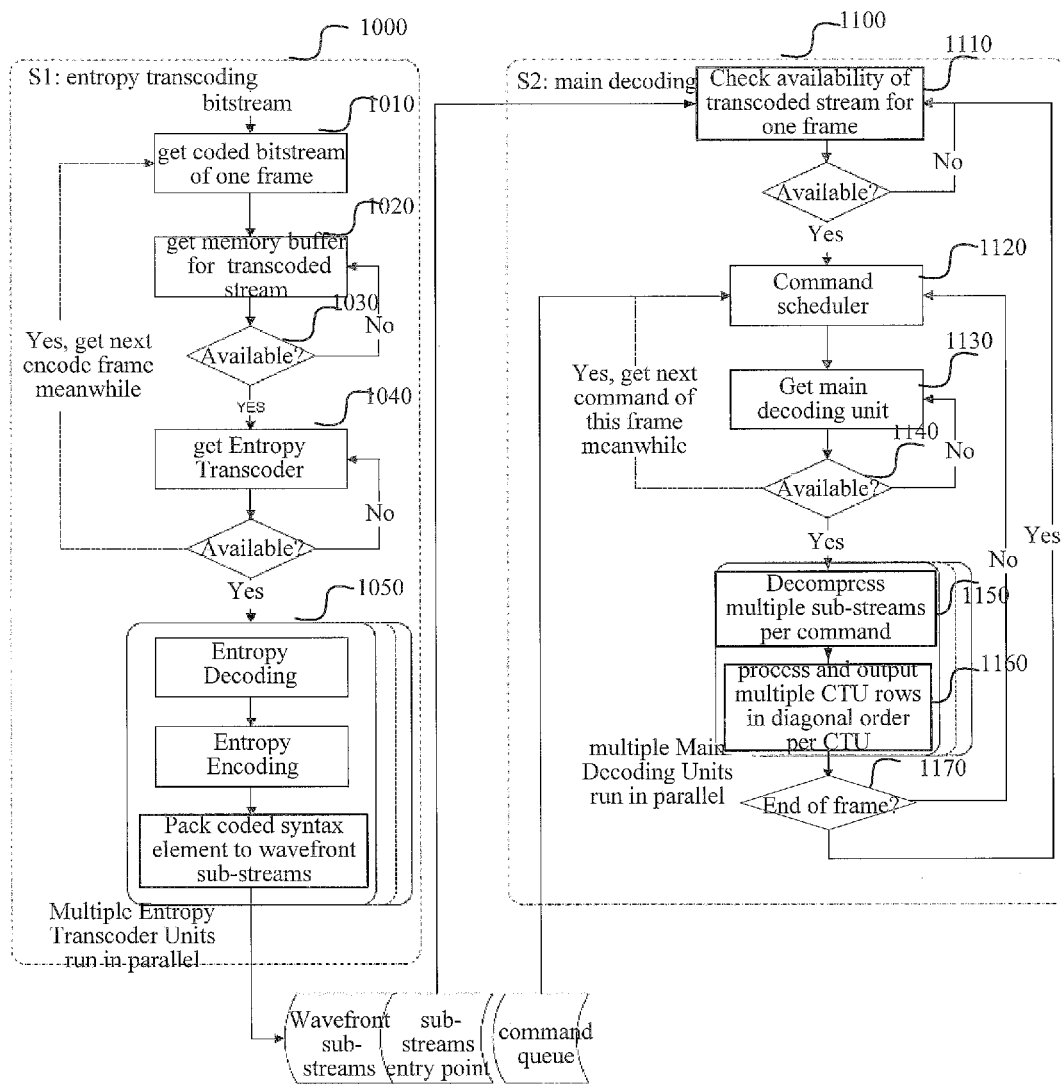
FIG. 10 is a flow chart illustrating a work flow of video decoder according to an embodiment of the invention.

FIG. 10 is a flow chart illustrating a work flow of video decoder according to an embodiment of the invention. Alternatively, each of the plurality of entropy transcoding in block 1000 further comprises obtaining, in block 1010, an available frame of the bit stream; obtaining, in block 1020, a memory buffer for transcoded stream; determining, in block 1030, whether the memory buffer for transcoded stream is available. If the memory buffer for transcoded stream is available, the method 1000 proceeds with block 1040, determining whether an entropy transcoder is available, if the entropy transcoder is available, then in block 1050, the method performs the entropy transcoding. The method obtains a next available frame of bit streams meanwhile if the entropy transcoder is available. The detailed operation for entropy transcoding has already been discussed with respect to FIG. 9; therefore its details are omitted in an embodiment.

Alternatively, each of the plurality of pixel decodings further comprises decompressing the transcoded stream so as to generate a decompressed stream; performing an inverse quantization, an inverse transform, an intra prediction, a motion compensation and a loop filtering on the decompressed stream; compressing reconstruction YUV data of the decompressed stream; caching motion compensation reference data of the decompressed stream into data in a compressed YUV format; and decompressing the data in the compressed YUV format.

Alternatively, performing one of the plurality of pixel decodings further comprises processing, by one of the plurality of main decoding units, a frame of different substreams in parallel to generate multiple basic processing unit rows; and decoding the multiple basic processing unit rows in a diagonal order that reuses inter reference data in both horizontal and vertical direction, which can refer to FIG. 5.

Alternative, referring to the right part of FIG. 10, before processing the frame of the different sub-streams in parallel, performing, in block 1100, the plurality pixel decodings further comprises checking, in block 1110, whether a frame of transcoded stream is available; and scheduling, in block 1120, by a command scheduler, a plurality of candidate main decoding units according to commands stored in a command queue if the frame of the transcoded stream is available. In an embodiment, the command scheduler may call instructions from the command queue, so as to schedule at least one corresponding main decoding unit to operate.

The method of performing pixel decodings further comprises obtaining main decoding unit in block 1130, and in block 1140, determining whether a main decoding unit is available, if the main decoding unit is available, then in block 1150, the method decompresses multiple substreams per command, and processes and outputs multiple CTU rows in the diagonal order per CTU in block 1160. Note if the result of block 1140 is available, the method meanwhile gets a next command of this frame, so as to ensure multiple main decoding units may work in parallel. Also note that meanwhile, multiple main decoding units may operate blocks 1150 and 1160 in parallel. The method proceeds with block 1170, determining whether an end of the frame is detected. If the end of the frame is detected, then the method goes back to block 1110. If the end of the frame is not detected, then the method goes back to block 1120.

The two stages, entropy transcoding (S1 or 1000) and main decoding (S2 or 1100), outline the overall decoding flow. The workflow has multiple entropy transcoders run in a frame parallelism, and multiple main decoding units run in a wavefront parallelism.

As shown in FIG. 10, by introducing the command queue and the command scheduler as shown in FIG. 10, communication between main decoding units and programmable controller (for example, CPU) can be minimized, so as to make sure that main decoding units run in a way as smooth as possible.

Alternatively, the plurality of entropy transcodings are performed in parallel; or the plurality of pixel decodings are performed in parallel.

Alternatively, performing the plurality of entropy transcodings is in parallel with performing the plurality of pixel decodings.

Alternatively, the basic processing unit comprises a coding tree unit, a super-block, or macroblock units.

The embodiments of the invention uses the frame level parallelization for the entropy transcoding part, and the multi-layer wavefront parallelization for the transcoded substreams decoding and the pixel decoding part within same frame.

The entropy transcoder will transform various picture structures such as tiles, slices, wavefronts into a unified format of wavefront sub-streams so that later stage may process them properly and efficiently.

Embodiments of the invention may remove the dependency of inter-frame decoding required by prior arts where pixel decoding part is performed in frame level parallelism, because the pixel decoding in prior art may handles CTUs from different frames in parallel, whereas in embodiments of the invention, all CTUs being treated in parallel are from the same frame, so that decoder performance may not be affected by the picture structure and decoding dependency of different frames that will otherwise cause some performance penalty. The entropy transcoder is conducted in parallel with the main decoding part via hardware accelerators to achieve a high performance.

Scalability of the wavefront parallelization may be improved in embodiments of the invention compared to the frame level parallelization, and also embodiments of the invention may have better decoding balance per the main decoding unit.

Compared to single layer wavefront in the conventional HEVC standard, the multi-layer wavefront and the multi-level Cache may be used to minimize the bandwidth requirement that is critical for 4K/8K video system. The first layer of wavefront is used to decode multiple CTU rows in the diagonal order by the pixel decoding unit so that the motion compensation local Cache's hit rate may be improved; and the second layer of wavefront is used to make the pixel decoding unit work paralleled in the wavefront style and the second level Cache's hit rate also may be improved.

Embodiments of the invention may feature a hybrid parallelization with very good scalability and decoding load balance, to be specific the frame level parallelization for the entropy transcoding; the multi-layer wavefront parallelization for the transcoded sub-streams decoding and the pixel decoding.

Embodiments of the invention may further feature the unified wavefront sub-streams by transcoding original streams that may be encoded with tiles, wavefronts or just slices without any parallelization tool.

Embodiments of the invention may further feature the multi-layer wavefront compared to a single layer wavefront in HEVC standard so that the motion compensation local Cache's hit rate can be improved, and DDR bandwidth can be reduced.

Embodiments of the invention may further feature the multi-level motion compensation cache with the wavefront architecture so that inter reference pixels can be reused across multiple main decoding units. Embodiments of the invention can save more bandwidth compared to conventional cache by prior arts such as pixel decoding frame level parallelism because of better correlation and spatial locality.

Embodiments of the invention may be suitable for multi-standard architecture, HEVC/H.265, Google VP9, China AVS2, etc.

Embodiments of the invention may further feature shared line buffers across multiple main decoding units with the wavefront architecture to minimize hardware implementation cost.

Although the present invention has been described with reference to specific exemplary embodiments, the present invention is not limited to the embodiments described herein, and it can be implemented in form of modifications or alterations without deviating from the spirit and scope of the appended claims. Accordingly, the description and the drawings are to be regarded in an illustrative rather than a restrictive sense.

From the foregoing, it will be appreciated that specific embodiments of the technology have been described herein for purposes of illustration, however various modifications can be made without deviating from the spirit and scope of the present invention. Accordingly, the present invention is not restricted except in the spirit of the appended claims.

Other variations to the disclosed embodiments can be understood and effected by those skilled in the art in practicing the claimed invention, from a study of the drawings, the disclosure, and the appended claims. In the claims the word "comprising" does not exclude other elements or steps, and the indefinite article "a" or "an" does not exclude a plurality. Even if particular features are recited in different dependent claims, the present invention also relates to the embodiments including all these features. Any reference signs in the claims should not be construed as limiting the scope.

Features and aspects of various embodiments may be integrated into other embodiments, and embodiments illustrated in this document may be implemented without all of the features or aspects illustrated or described. One skilled in the art will appreciate that although specific examples and embodiments of the system and methods have been described for purposes of illustration, various modifications can be made without deviating from the spirit and scope of the present invention. Moreover, features of one embodiment may be incorporated into other embodiments, even where those features are not described together in a single embodiment within the present document. Accordingly, the invention is described by the appended claims.

I claim:

1. A circuit for decoding a video, comprising:
at least one entropy transcoder configured to perform at least one entropy transcoding on a received bit stream, to generate transcoded streams, wherein each of the at least one entropy transcoding includes transcoding syntax for the bit stream; and
a plurality of main decoding units configured to perform, simultaneously and in parallel, a plurality of transcoded stream decompression and pixel decodings on a frame of the transcoded streams in a multi-layer wavefront level parallelization,
wherein the at least one entropy transcoder comprises a plurality of entropy transcoders, the plurality of entropy transcoders is configured to perform a plurality of entropy transcodings on a received bit stream, in a frame level parallelization, to generate transcoded streams, and each of the plurality of entropy transcoding includes transcoding syntax for the bit stream, and
wherein each of the plurality of the main decoding units is further configured to:
process a frame of different sub-streams in parallel to generate multiple basic processing unit rows; and
decoding the multiple basic processing unit rows in a diagonal order that reuses inter reference data in both horizontal and vertical direction.

2. The circuit of claim 1, wherein the received bit stream is encoded in different formats, wherein each of the plurality of the entropy transcoders is further configured to transform the received bit stream encoded in different formats into the transcoded stream in a unified wavefront substeam format.

3. The circuit of claim 2, wherein the different formats include tile parallelization, wavefront parallelization, slice parallelization or slice without parallelization.

4. The circuit of claim 1, wherein the received bit stream is encoded in different formats, and each of the plurality of entropy transcoders further comprises:
an entropy decoder configured to entropy decode the received bit stream encoded in different formats;
an entropy encoder configured to entropy encode the decoded bit stream; and
a stream packer configured to pack the encoded bit stream into a unified format of wavefront substreams.

5. The circuit of claim 4, wherein the entropy transcoder is further configured to:
obtain an available frame of the bit stream;
determine whether a memory buffer for transcoding stream is available;
determine whether an entropy transcoder is available, if the memory buffer for transcoding stream is available;
perform entropy transcoding; and
obtain a next available frame of bit stream meanwhile if the entropy transcoder is available.

6. The circuit of claim 1, wherein each of the plurality of main decoding units further comprises:
a transcoded stream decompressor configured to decompress the transcoded stream so as to generate a decompressed stream;
a pixel decoder configured to perform inverse quantization, inverse transform, intra prediction, motion compensation and loop filtering on the decompressed stream;
a frame buffer compressor configured to compress reconstruction YUV data of the decompressed stream;
a motion compensation cache configured to cache motion compensation reference data of the decompressed stream into data in a compressed YUV format; and
a frame buffer decompressor configured to decompress the data in the compressed YUV format.

7. The circuit of claim 1, further comprising a command scheduler, wherein each of the plurality of the main decoding units is further configured to:
check whether a frame of transcoded stream is available; and
the command scheduler is configured to schedule a plurality of candidate main decoding units according to commands stored in command queue if the frame of the transcoded stream is available.

8. The circuit of claim 1, wherein the plurality of entropy transcoders operate in parallel; or the plurality of main decoding units operate in parallel.

9. The circuit of claim 1, wherein the plurality of entropy transcoders operate in parallel with the plurality of main decoding units.

10. The circuit of claim 1, wherein each basic processing unit in the multiple basic processing unit rows comprises a coding tree unit, a super-block, or a macroblock unit.

11. The circuit of claim 1, further comprising a line buffer configured to perform intra prediction, deblocking filtering, sample adaptive offset filtering, and is configured to be shared by the plurality of main decoding units.

12. The circuit of claim 1, wherein each of the plurality of main decoding units includes a motion compensation cache, and the circuit further comprises at least a shared cache which is shared by the plurality of main decoding units.

13. A method of decoding video, comprising
performing at least one entropy transcoding on a received bit stream, to generate transcoded streams, wherein each of the at least one entropy transcoding includes transcoding syntax for the bit stream;
performing at least one transcoded stream decompression and pixel decodings on a frame of the transcoded streams, wherein:
performing at least one transcoded stream decompression and pixel decodings further comprises performing, simultaneously and in parallel, a plurality of pixel decodings on a frame of the transcoded streams in a multi-layer wavefront level parallelization,
wherein performing the at least one entropy transcoding further comprises performing a plurality of entropy transcodings on a received bit stream, in a frame level parallelization, to generate transcoded streams, wherein each of the plurality of entropy transcoding includes transcoding syntax for the bit stream, and
wherein performing one of the plurality of pixel decodings further comprises:
processing, by one of the plurality of main decoding units, a frame of different sub-streams in parallel to generate multiple basic processing unit rows; and
decoding the multiple basic processing unit rows in a diagonal order that reuses inter reference data in both horizontal and vertical direction.

14. The method of claim 13, wherein the received bit stream is encoded in different formats, wherein performing each of the plurality of entropy transcoding further comprises
transforming the received bit stream encoded in different formats into the transcoded stream in a unified wavefront substeam format.

15. The method of claim 13, wherein the different formats include tile parallelization, wavefront parallelization, slice parallelization or slice without parallelization.

16. The method of claim 13, wherein the received bit stream is encoded in different formats, and performing each of the plurality of entropy transcoding further comprises
entropy decoding the received bit stream encoded in different formats;
entropy encoding the decoded bit stream; and
packing the encoded bit stream into a unified format of wavefront substreams.

17. The method of claim 16, wherein each of the plurality of entropy transcoding further comprises:
obtaining an available frame of the bit stream;
determining whether a memory buffer for transcoding stream is available;
determining whether an entropy transcoder is available, if the memory buffer for transcoding stream is available;
perform entropy transcoding; and
obtaining a next available frame of bit stream meanwhile if the entropy transcoder unit is available.

18. The method of claim 13, wherein each of the plurality of pixel decodings further comprises:
decompressing the transcoded stream so as to generate a decompressed stream;
performing inverse quantization, inverse transform, intra prediction, motion compensation and loop filtering on the decompressed stream;
compressing reconstruction YUV data of the decompressed stream;
caching motion compensation reference data of the decompressed stream into data in a compressed YUV format; and
decompressing the data in the compressed YUV format.

19. The method of claim 13, wherein before processing the frame of the different sub-streams in parallel, performing the plurality of pixel decodings further comprises:
checking whether a frame of transcoded stream is available; and
scheduling, by a command scheduler, a plurality of candidate main decoding units according to commands stored in command queue if the frame of the transcoded stream is available.

20. The method of claim 13, wherein the plurality of entropy transcodings are performed in parallel; or the plurality of pixel decodings are performed in parallel.

21. The method of claim 13, wherein performing the plurality of entropy transcoding is in parallel with performing the plurality of pixel decodings.

22. The method of claim 13, wherein each basic processing unit in the multiple basic processing unit rows comprises a coding tree unit, a super-block, or a macroblock unit.

23. A video decoder, comprising the circuit according to claim 1.

* * * * *